(12) United States Patent
Möbius et al.

(10) Patent No.: US 9,184,506 B2
(45) Date of Patent: Nov. 10, 2015

(54) WAVEGUIDE ANTENNA FOR A RADAR ANTENNA ARRAY

(75) Inventors: Arnold Möbius, Neubiberg (DE); Wolfgang Fey, Bodolz (DE)

(73) Assignee: Conti Temic Microelectronic GmbH (DE)

( * ) Notice: Subject to any disclaimer, the term of this patent is extended or adjusted under 35 U.S.C. 154(b) by 340 days.

(21) Appl. No.: 13/578,299

(22) PCT Filed: Mar. 24, 2011

(86) PCT No.: PCT/DE2011/000305
§ 371 (c)(1),
(2), (4) Date: Oct. 19, 2012

(87) PCT Pub. No.: WO2011/120500
PCT Pub. Date: Oct. 6, 2011

(65) Prior Publication Data
US 2013/0141271 A1 Jun. 6, 2013

(30) Foreign Application Priority Data
Mar. 31, 2010 (DE) .......................... 10 2010 013 590

(51) Int. Cl.
*G01S 7/521* (2006.01)
*H01Q 13/00* (2006.01)
*H01Q 1/32* (2006.01)
*H01Q 13/28* (2006.01)
*G01S 7/03* (2006.01)

(52) U.S. Cl.
CPC ................ *H01Q 13/00* (2013.01); *G01S 7/032* (2013.01); *H01Q 1/32* (2013.01); *H01Q 13/28* (2013.01)

(58) Field of Classification Search
CPC ... H01Q 13/28; H01Q 21/0043; H01Q 13/22; H01Q 13/20; H01Q 13/00; H01Q 1/32; G01S 7/032

USPC ................... 342/175; 343/772, 785
See application file for complete search history.

(56) References Cited

U.S. PATENT DOCUMENTS 3,597,710 A * 8/1971 Levy .............................. 333/210
4,378,558 A * 3/1983 Lunden .......................... 343/814

(Continued)

FOREIGN PATENT DOCUMENTS

DE 1 275 649 8/1968
DE 10 2004 049 626 A1 4/2006

(Continued)

OTHER PUBLICATIONS

Iwasaki, T.; Kamoda, H.; Derham, T.; Kuki, T., "A Composite Right/Left-Handed Rectangular Waveguide with Tilted Corrugations for Millimeter-wave Frequency Scanning Antenna," Microwave Conference, 2008. EuMC 2008. 38th European, vol., No., pp. 563,566, Oct. 27-31, 2008.*

(Continued)

*Primary Examiner* — John B Sotomayor
*Assistant Examiner* — Marcus Windrich
(74) *Attorney, Agent, or Firm* — RatnerPrestia (57) ABSTRACT

A waveguide antenna for a radar antenna array, particularly for use in motor vehicles, includes a metal waveguide extending in an x direction and having a longitudinal axis, which, for the propagation of a radar wave of a first mode in the x direction, delimits an inner space, wherein in order to specifically convert the first mode to a second mode of the radar wave which is different from the first mode and to couple the second mode out of the waveguide, a plurality of structural elements arranged in the x direction are provided which extend into the inner space and wherein adjacent structural elements have a distance which is larger than half a waveguide wavelength of the radar wave of the first mode or larger than half a free-space wavelength, depending on which of the two wavelengths is smaller.

16 Claims, 9 Drawing Sheets

(56) References Cited

U.S. PATENT DOCUMENTS

| | | | |
|---|---|---|---|
| 4,862,186 A * | 8/1989 | Strider | 343/776 |
| 5,572,228 A | 11/1996 | Manasson et al. | |
| 5,995,055 A * | 11/1999 | Milroy | 343/772 |
| 6,075,494 A * | 6/2000 | Milroy | 343/776 |
| 6,259,407 B1 * | 7/2001 | Tran | 343/700 MS |
| 6,832,081 B1 * | 12/2004 | Hiramatsu et al. | 455/328 |
| 6,917,266 B2 | 7/2005 | Mack | |
| 7,006,733 B2 * | 2/2006 | Galstian et al. | 385/37 |
| 7,689,086 B2 * | 3/2010 | Magnusson et al. | 385/129 |
| 2002/0175865 A1 * | 11/2002 | Cassel et al. | 343/702 |
| 2004/0090290 A1 * | 5/2004 | Teshirogi et al. | 333/237 |
| 2010/0001917 A1 | 1/2010 | Manasson et al. | |

FOREIGN PATENT DOCUMENTS

| | | |
|---|---|---|
| DE | 10 2008 004 940 A1 | 7/2009 |
| JP | 2009-212828 | 9/2009 |
| WO | WO 2006/039896 A1 | 4/2006 |

OTHER PUBLICATIONS

Sultan, Zamil ; Ahmed, Anis, "Analysis of the Characteristics of Square Corrugated Optical Waveguide", Bangladesh Research Publications Journal, vol. 3, pp. 1107-1115, Jan.-Feb. 2010.*

Iwasaki et al., "A Novel Composite Right/Left-Handed Rectangular Waveguide with Tilted Corrugations and Its Application to Millimeter-Wave Frequency-Scanning Antenna," IEICE Trans. Commun., vol. E92-B, No. 12, Dec. 2009, pp. 3843-3849.

Guglielmi et al., "Broadside Radiation from Periodic Leaky-Wave Antennas," IEEE Transactions on Antennas and Propagation, vol. 41 (Jan. 1993), No. 1, pp. 31-37.

International Search Report for PCT Application No. PCT/DE2011/000305 mailed Aug. 1, 2011.

German Search Report for Application No. 10 2010 013 590.9 mailed Jan. 11, 2011.

International Preliminary Report on Patentability for International Application No. PCT/DE2011/000305 dated Oct. 2, 2012.

* cited by examiner

WAVEGUIDE ANTENNA FOR A RADAR ANTENNA ARRAY

CROSS REFERENCE TO RELATED APPLICATIONS

This application is the U.S. National Phase Application of PCT/DE2011/000305, filed Mar. 24, 2011, which claims priority to German Patent Application No. 10 2010 013 690.9, filed Mar. 31, 2010, the contents of such applications being incorporated by reference herein.

FIELD OF THE INVENTION

The invention relates to a waveguide antenna for a radar antenna array, particularly for use in motor vehicles.

BACKGROUND OF THE INVENTION

Such antennas are known, for example, from U.S. Pat. No. 5,572,228, which is incorporated by reference, wherein they are realized in a mechanically pivoting manner by letting a surface-structured drum rotate in close proximity to a dielectric waveguide. The surface structuring of the drum is realized by individual metal strips, the distance of which varies when the drum rotates within the region of the dielectric waveguide. This effects power to be coupled out of the dielectric waveguide via a so-called leaky wave as a function of the rotational angle. The coupled-out power spreads in space in the form of radiation which can be described by a directional antenna pattern. The polarization of the radiated wave is oriented parallel to the metal strips present on the drum.

According to WO 2006/039 896 A1, which is incorporated by reference, an alternative waveguide type is used which is arranged in the vicinity of an interference structure such as a surface-structured drum. The waveguide comprises metallic sections spaced apart from one another and having a dielectric medium arranged in between them. The electromagnetic wave is coupled in between the metallic sections in the longitudinal direction. The metallic sections extend in the longitudinal direction, are open toward the interference structure and the side opposite to it in a first transverse direction and spaced apart from one another in a second transverse direction, wherein the second transverse direction is perpendicular to both the first transverse direction and the longitudinal direction of the waveguide. Such a waveguide exhibits high ohmic losses. An increased number of components leads to an increase in manufacturing costs and, due to the rotating cylinder, results in an antenna application which is prone to disturbances. Furthermore, the rotating cylinder requires the production tolerances and mechanical stresses to be reduced, such that the production expenditure increases even more, making such a waveguide cost-intensive.

BRIEF DESCRIPTION OF THE INVENTION

The present invention is a waveguide antenna for a radar antenna array which generates low losses during its application and which, at the same time, is robust and can be manufactured in a cost-efficient manner.

This is achieved according to the invention by a waveguide antenna for a radar antenna array, particularly for use in motor vehicles, including a metal waveguide extending in an x direction and having a longitudinal axis, which, for the propagation of a radar wave of a first mode in the x direction delimits an inner space, wherein in order to specifically convert the first mode to a second mode of the radar wave which is different from the first mode and to couple the second mode out of the waveguide, a plurality of structural elements arranged in the x direction are provided which extend into the inner space, wherein adjacent structural elements have a distance which is larger than half a waveguide wavelength ($\lambda_1/2$) of the radar wave of the first mode or larger than half a free-space wavelength ($\lambda_0/2$), depending on which of the two wavelengths ($\lambda_1, \lambda_0$) is smaller.

According to aspects of the invention it has been found that a metal waveguide guides a radar wave of a first mode and that the radar wave is radiated from the waveguide by structural elements in a second mode which is different from the first mode. The waveguide extends in an x direction and, for the propagation of the radar wave in the first mode in the x direction, delimits an inner space into which the structural elements extend. With regard to the radar wave guided in the waveguide in the first mode, the structural elements act as interference points, where part of the guided power is converted to the second mode and coupled out, resulting in a phased array antenna. It has been found that, when the structural elements are arranged along the x direction adequately spaced apart from one another, it is possible to specifically couple the power out of the first mode of the radar wave guided in the waveguide to the second mode. For this purpose, a distance of adjacent structural elements has to be larger than half a free-space wavelength of the radar wave of the first mode. In the case that a dielectric is arranged in the waveguide, the waveguide wavelength can become smaller than the free-space wavelength, and the distance of the adjacent structural elements has to be larger than half a waveguide wavelength in this case. By arranging the structural elements along the x direction, it is possible to set different radiation directions of the radiated wave in the second mode, corresponding to the phase assignments created by said arrangement.

If the structural elements are designed such that the structural elements each extend along a transverse axis which includes an acute angle with the longitudinal axis, a plane of symmetry is rotated by 90° with respect to the first output mode when the second mode is coupled out. Thus, for example, a further dominant mode, the TE01 mode, can be coupled out of the dominant mode of the radar wave, the TE10 mode, guided in the waveguide. This means that the distribution of the electromagnetic field, which is symmetrical in a transverse direction, has to be converted asymmetrically. The structural elements having a transverse axis are therefore arranged at angles such that their transverse axis and the longitudinal axis of the waveguide include an acute angle.

A waveguide antenna such that the structural elements have a constant structural height along the transverse axis ensures constant radiation characteristics at the structural elements.

A waveguide array having a cross-section oriented in a z direction which is perpendicular to the x direction, said cross-section having two sidewalls which are arranged opposite one another and which are provided on their inner surfaces with ribs as structural elements has a robust structure and can be manufactured in a cost-efficient manner. The use of ribs as structural elements enables the structural elements to be manufactured integrally on the sidewalls of the waveguide.

Structural elements designed in accordance with a waveguide antenna having a two-step rib which is symmetrical with respect to the transverse axis enable the radar wave guided in the waveguide to be coupled out according to the invention, on the one hand, and, at the same time, the suppression of so-called diffraction lobes, also referred to as grating lobes. Grating lobes can occur when the wavelength of the radar wave guided in the waveguide is larger than or equal to the free-space wavelength. If the structural elements are appropriately designed as two-step ribs which are symmetrical with respect to the transverse axis, additional measures usually taken to suppress grating lobes can be avoided.

A waveguide antenna in which the ribs of opposite sidewalls are arranged in an offset manner along the x direction enables the plane of symmetry of the coupled-out second mode to be rotated with respect to the first mode guided in the waveguide.

With a waveguide antenna having a dielectric or diaphragms arranged at periodic distances are provided in the waveguide for reducing the waveguide path length, the wavelength of the radar wave guided in the waveguide is shortened with respect to the one of the free space so as to suppress grating lobes. For this purpose, either a dielectric or periodically arranged diaphragms are provided in the waveguide.

A waveguide antenna in which the waveguide is connected to a base plate has a robust structure. In particular, such a waveguide antenna has a high mechanical strength.

A waveguide antenna in which grooves or ribs arranged on the base plate as structural elements can be manufactured easily and cost-efficiently by arranging the structural elements on the base plate.

When designing the waveguide of a waveguide antenna in which a cross-section of the waveguide changes in the vertical z direction, the radar wave guided in the waveguide, in particular a TE10 mode, cannot escape even if an opening of the waveguide is arranged at an upper end. In a waveguide like this, the radar wave fed in the x direction is trapped inside the waveguide and—except via the structural elements—does not radiate any power.

If the sidewalls of the waveguide are designed in a curved manner in accordance with a waveguide antenna in which the cross-section of the waveguide is designed in an hour-glass shape, wherein the sidewalls each have a curvature directed toward the inner space, the shaping of the radiated radar wave in the y direction is further improved.

If adjacent structural elements are arranged in accordance with a waveguide antenna where at least some adjacent structural elements are arranged in the x direction at a periodic distance from one another, a constructive superposition of the radiated second mode can occur in only a few and in particular in only one direction. If all structural elements are arranged periodically along the x direction of the waveguide, the production method is simplified even further, such that the manufacture of such a waveguide antenna can take place at reduced costs.

By an aperiodic arrangement of structural elements of a waveguide antenna where an aperiodic distance of adjacent structural elements in the x direction deviates by less than 5%, in particular by less than 2% and in particular by less than 1%, from the periodic distance, undesired constructive superpositions can be suppressed which occur in the direction opposite to a propagation direction of the radar wave in the first mode fed into the waveguide. The aperiodic arrangement of the structural elements is also referred to as jittering.

BRIEF DESCRIPTION OF THE DRAWINGS

The invention is best understood from the following detailed description when read in connection with the accompanying drawings. Included in the drawings are the following figures.

DETAILED DESCRIPTION OF INVENTION

Figure 1:
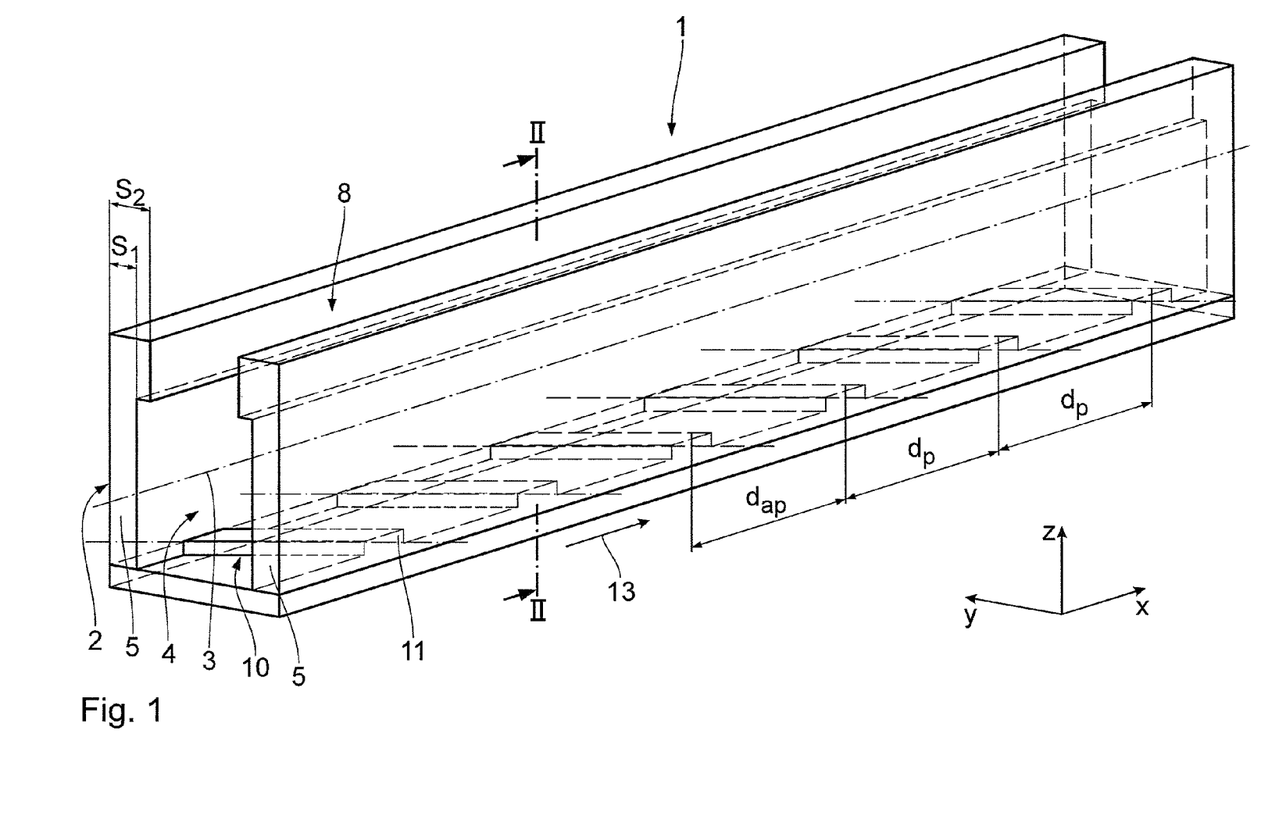
FIG. 1 shows a waveguide antenna with a base plate according to a first exemplary embodiment.
Figure 2:
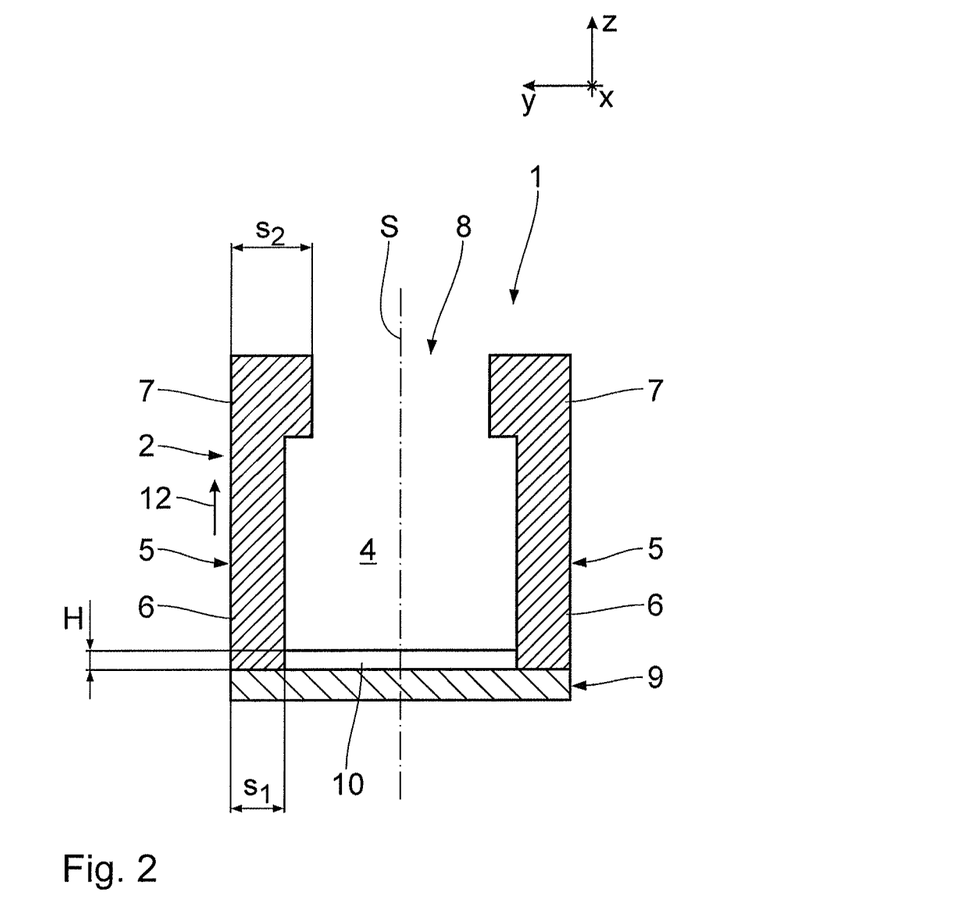
FIG. 2 shows a sectional representation along the sectional line II-II of FIG. 1 in a sectional plane extending parallel to an x-z plane.

FIGS. 1 and 2 show a first exemplary embodiment of a waveguide antenna 1 for a radar antenna array which can be used particularly in motor vehicles for the purpose of determining and/or monitoring the distance. The waveguide antenna 1 is integrated into the radar antenna array in a manner known per se. The waveguide antenna 1 has a metal waveguide 2 which extends in an x direction and has a longitudinal axis 3 extending parallel to the x direction. For the propagation of a radar wave of a first mode in the x direction, the waveguide 2 delimits an inner space 4. The radar wave in the first mode propagates in the inner space 4 with a waveguide wavelength $\lambda_1$.

The waveguide antenna 1 according to the exemplary embodiment shown is particularly adapted to guide the dominant mode TE10 in the waveguide 2. For this purpose, the waveguide 2 has a substantially U-shaped cross-section oriented in a z direction which is perpendicular to the x direction, said cross-section having two sidewalls 5 arranged symmetrically opposite one another which are formed identically. With respect to the vertical z direction, the sidewalls 5 each have a lower sidewall section 6 and an upper sidewall section 7 being integrally formed thereon, which, compared to a wall thickness $s_1$ of the lower sidewall section 6, has a larger wall thickness $s_2$ along a y direction oriented perpendicularly to both the x direction and z direction. The inner space 4 is thus tapered upwardly along the z direction. Even though the waveguide 2, having a substantially rectangular outer contour, has an opening 8 at an upper end, the TE10 mode of the radar wave propagating in the waveguide 2 along the x direction cannot exit the waveguide 2 through the opening 8. Thus, no power of the radar wave is radiated through the opening 8.

As a consequence of the identical design of the sidewalls 5, the waveguide antenna 1 with the waveguide 2 is formed substantially symmetrically to a plane of symmetry S extending parallel to the x-z plane.

At a bottom arranged opposite the opening 8, the waveguide 2 is fixedly connected to a base plate 9, for example by gluing or electroplating, such that the waveguide 2 is sealed tight towards the bottom. The base plate has a rectangular cross-section and its shape is adjusted to the waveguide 2.

In the exemplary embodiment shown, the waveguide 2 has a plurality of structural elements in the form of ribs 10 arranged in the x direction and extending into the inner space 4. The ribs 10 each have a transverse axis 11 which includes an acute angle with the longitudinal axis 3. The ribs 10 connect the two opposite sidewalls 5 and are formed integrally on the sidewalls 5 according to the exemplary embodiment shown in FIGS. 1 and 2. It is also possible to manufacture the ribs 10 separately from the sidewalls 5 and subsequently connect them to said sidewalls.

The ribs 10 serve to specifically couple the TE10 mode guided in the waveguide 2 along the x direction out of the waveguide 2 by conversion to another mode, preferably the TE01 mode. In the second mode the radar wave propagates with a waveguide wavelength $\lambda_2$ which is generally different from the waveguide wavelength $\lambda_1$ of the radar wave in the first mode. On conversion of the TE10 mode to the TE01 mode a plane of symmetry of the TE10 mode is rotated by 90°, meaning that a field distribution of the TE10 mode which is symmetrical along a transverse direction 12 extending parallel to the z direction is converted to an asymmetrical field distribution along the transverse direction 12 of the TE01 mode. For this purpose the ribs 10 are arranged asymmetrically, i.e. at angles, with respect to a propagation direction 13 of the radar wave of the TE10 mode extending parallel to the x direction, said arrangement being achieved by the transverse axis 11 and the longitudinal axis 3 including an acute angle. The TE01 mode is radiated from the waveguide 2 in the x-z plane. The radiation direction of the TE01 mode is within an angular range of ±20° around the z axis. If the TE01 mode is radiated from the waveguide 2, the radar wave once again has the free-space wavelength $\lambda_0$. With an adequately selected length of the waveguide, the waveguide wavelength $\lambda_2$ can be influence such that it corresponds approximately to the free-space wavelength $\lambda_0$.

The ribs 10 are spaced apart from one another in the x direction in order to specifically convert the first mode, for example the TE10 mode, to a second mode of the radar wave which is different from the first mode, for example the TE01 mode, and to couple the second mode out of the waveguide 2. At least some adjacent ribs 10 can be arranged at a periodic distance $d_p$ from one another in the x direction. It is further possible that adjacent ribs 10 have an aperiodic distance $d_{ap}$ in the x direction which, according to the exemplary embodiment shown, deviates by less than 5% from the periodic distance $d_p$. As a consequence of the periodic arrangement of the ribs 10 it is achieved that the radiated radar wave in the TE01 mode constructively superposes itself in only a few directions, and in particular in only one direction. In the case that all ribs 10 are arranged at an identical, periodic distance $d_p$ which corresponds to an integral multiple of half the waveguide wavelength $\lambda_1/2$ of the radar wave in the first mode, constructive superpositions can occur which counteract the TE10 mode in the direction opposite to the propagation direction 13 of the radar wave. To avoid this negative effect, the ribs 10 are arranged along the x direction at least partially at slightly varying distances $d_{ap}$ from one another, i.e., a periodically. To keep as low as possible the number of radiation directions in which the TE01 mode constructively superposes itself, on the one hand, and, at the same time, to minimize the constructive superposition in the direction opposite to the propagation direction of the TE10 mode in the waveguide 2, the aperiodic distance $d_{ap}$ deviates in particular by less than 2% and in particular by less than 1% from the periodic distance $d_p$. In any case the distances $d_p$ and $d_{ap}$ are larger than half the first waveguide wavelength $\lambda_1/2$ of the radar wave of the first mode, i.e. the TE10 mode, or larger than half the free-space wavelength $\lambda_0/2$.

The ribs 10 have a rectangular cross-section oriented perpendicularly to the transverse axis 11, wherein a structural height H along the transverse axis 11 of the ribs 10 remains constant.

Figure 3:
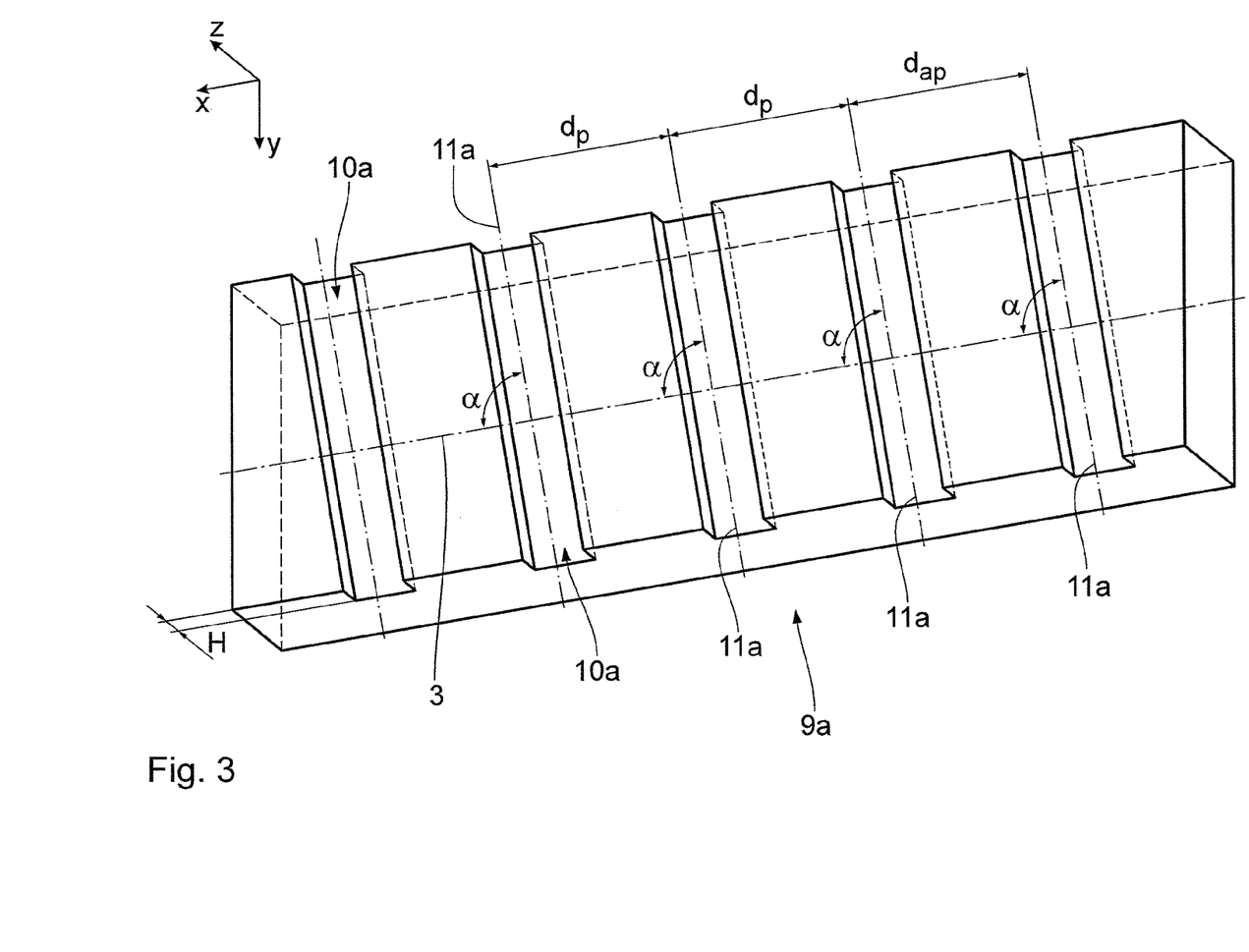
FIG. 3 shows a perspective representation of a base plate according to another exemplary embodiment of a waveguide antenna according to FIG. 1.

In the following, another exemplary embodiment of the invention will be described with reference to FIG. 3. Structurally identical parts are given the same reference numerals as in the first exemplary embodiment, the description of which is hereby made reference to. Parts which are structurally different but have a similar function are given the same reference numerals, followed by an a. The substantial difference of the base plate 9a represented in FIG. 3, which can be connected to a waveguide, not shown, so as to form a waveguide antenna, is the fact that the structural elements in the form of grooves 10a are integrated into the base plate 9. Each groove 10a has a cross-section which is rectangular along the transverse axis 11a, said cross-section having a constant structural height H, wherein each of the transverse axes 11a and the longitudinal axis 3 include an acute angle α. The grooves 10a are also arranged at periodic distances $d_p$ and aperiodic distances $d_{ap}$ along the x direction. It is also possible that the structural elements are provided in the form of ribs, not shown, on the base plate 9a, wherein said ribs protrude into the inner space of the waveguide.

Figure 4:
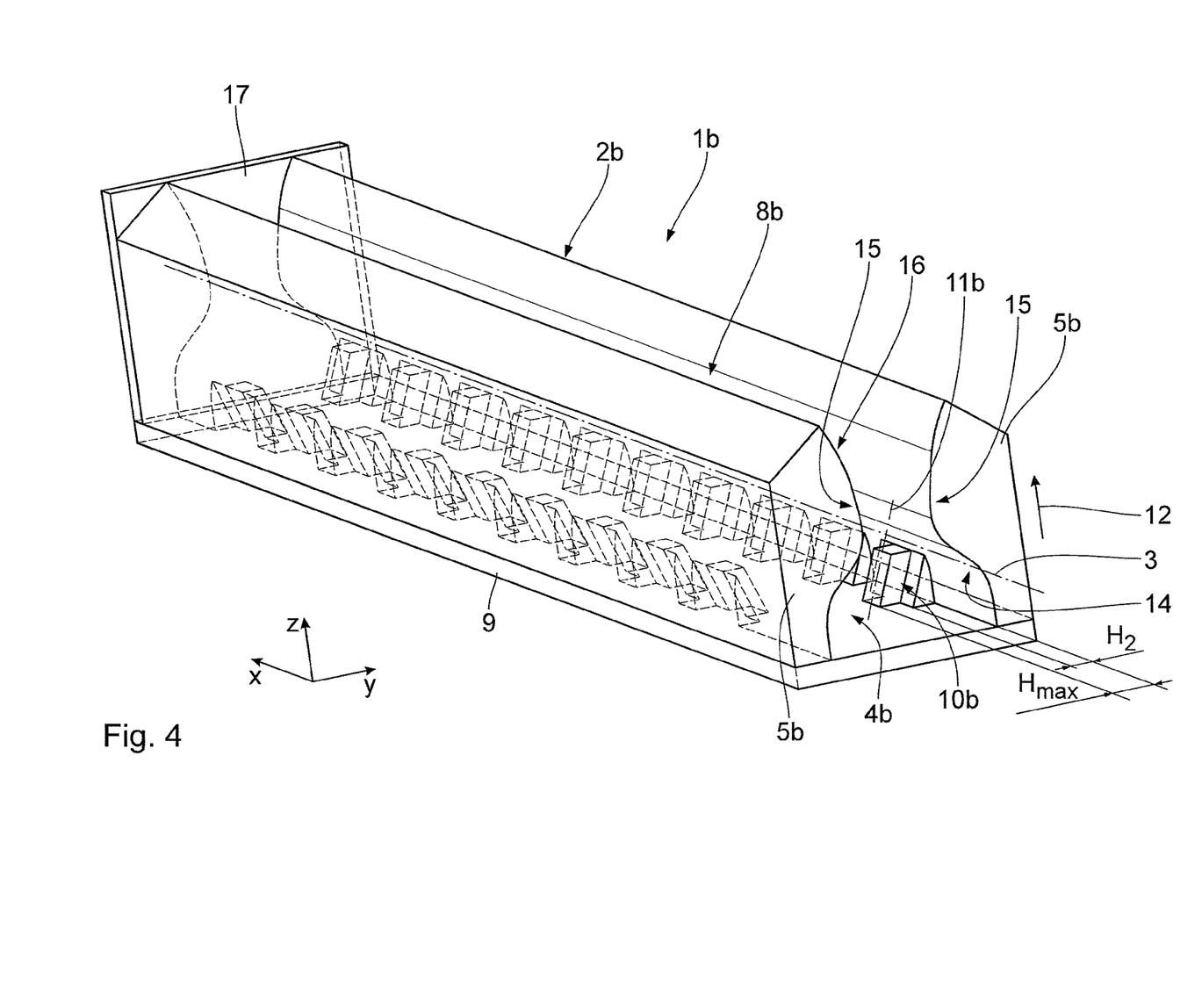
FIG. 4 shows a perspective representation of a waveguide antenna corresponding to FIG. 1 according to another exemplary embodiment.

In the following, another exemplary embodiment of the invention will be described with reference to FIG. 4. Structurally identical parts are given the same reference numerals as in the first exemplary embodiment, the description of which is hereby made reference to. Parts which are structurally different but have a similar function are given the same reference numerals, followed by b. As in the first exemplary embodiment, the structural elements are provided as ribs 10b on the waveguide 2b. According to the embodiment shown in FIG. 4, the ribs 10b are formed as a two-step rib with respect to the transverse axis 11b. The two-step design of the ribs 10b is such that the ribs 10b have a maximum structural height $H_{max}$ along the x direction and with reference to the transverse axis 11b which, starting from the transverse axis 11b, decreases stepwise symmetrically in both directions to a structural height $H_2$ which is reduced with respect to the maximum structural height $H_{max}$. The T-shaped cross-section of the rib 10b formed by the structural heights $H_2$ and $H_{max}$ also exhibits constant structural heights $H_2$, $H_{max}$ along the transverse axis 11b.

The ribs 10b are integrally formed on the waveguide 2, said waveguide being milled from a metal block, for example.

The ribs 10b are arranged so as to be inclined with respect to the transverse direction 12, such that the transverse axes 11b and the longitudinal axis 3 of the waveguide 2b include an acute angle. The two-step design of the ribs 10b allows the radar wave with the second mode to be coupled out of the waveguide 2b of the waveguide antenna 1b, on the one hand, and, at the same time, to suppress the so-called grating lobes.

The ribs 10b are provided on inner surfaces 14 of the sidewalls 5b arranged opposite one another. Along the x direction the ribs 10b are arranged on the opposite sidewalls 5b in an offset manner, thus ensuring the asymmetrical arrangement of the structural elements required to convert and couple out the TE10 mode to the TE01 mode.

The cross-section of the waveguide 2b and thus the inner space 4b are substantially hour-glass shaped in that the sidewalls 5b each have a curvature 15 directed toward the inner space 4b. Such a design of the waveguide 2b with the corresponding inner space 4b serves to achieve an improved guidance of the TE10 mode fed in the x direction, on the one hand, and to adjust a defined characteristic of the radiated TE01 mode, both in its propagation direction and in its azimuthal direction, on the other hand. In particular the shaping of the characteristic of the radiated TE01 mode in the azimuthal direction can be improved by designing the cross-section of the waveguide 2b with the inner space 4b. For the purpose of beam shaping of the radar wave in the TE10 mode guided in the waveguide 2b in the transverse direction 12, the waveguide 2b has a cross-section which becomes larger toward the opening 8b. Due to its curved contour, this section of the waveguide 2b is referred to as a nonlinear output taper 16.

The two sidewalls 5b are integrally and fixedly connected to each other via a rear wall 17. It is also possible that a so-called transition segment is attached to the waveguide 2b at ends of the sidewalls 5b opposite the ends which are connected to the rear wall 17. In this case the sidewalls 5b are additionally connected by a front wall, not shown, having an opening for feeding the radar wave.

In the following another exemplary embodiment of the invention will be described with reference to FIGS. 5 to 9. Structurally identical parts are given the same reference numerals as in the first exemplary embodiment, the description of which is hereby made reference to. Parts which are structurally different but have a similar function are given the same reference numerals, followed by a c. The exemplary embodiment shown here is essentially different from the exemplary embodiments represented above in that the waveguide 2c can be connected to the base plate 9c in a force fit and in a form fit. It is also possible that the waveguide 2c can be connected to the base plate 9c either in a force fit or in a form fit. For this purpose the base plate 9c has a base plate profile 19 extending away from a top surface 18 of the base plate 9c and cooperating with a corresponding waveguide profile 20 for achieving a force-fit and/or form-fit connection of the waveguide 2c to the base plate 9c. Both the base plate profile 19 and the waveguide profile 20 can be seen in an unconnected state of the waveguide 2c and the base plate 9c corresponding to FIGS. 5 and 6.

Figure 5:
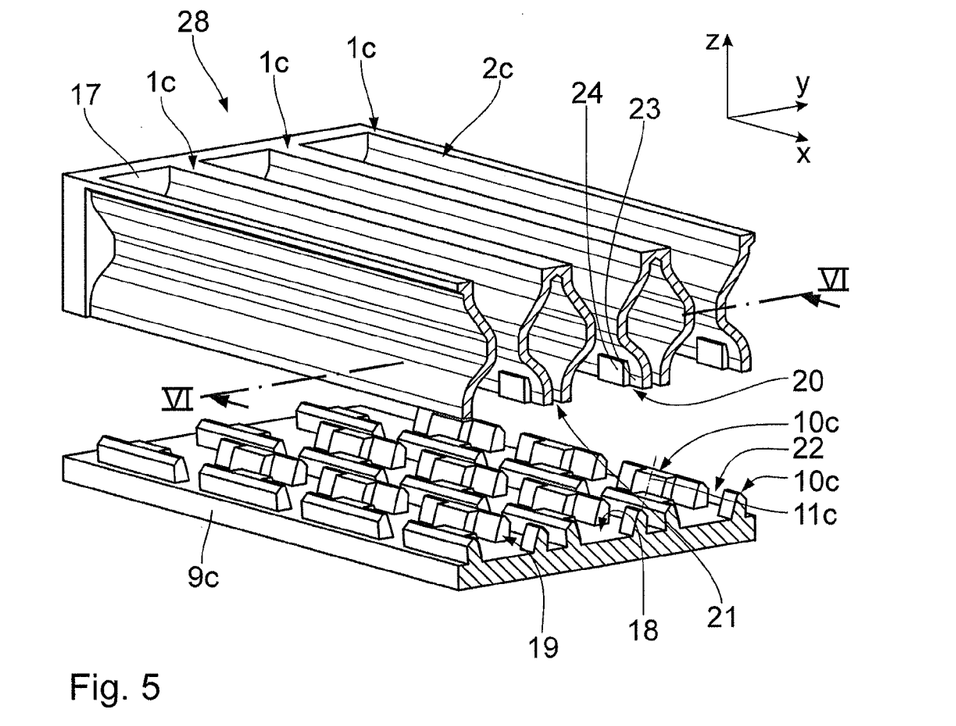
FIG. 5 shows a perspective representation of a waveguide antenna according to another exemplary embodiment, with a waveguide to be placed onto a base plate in an unconnected state.
Figure 6:
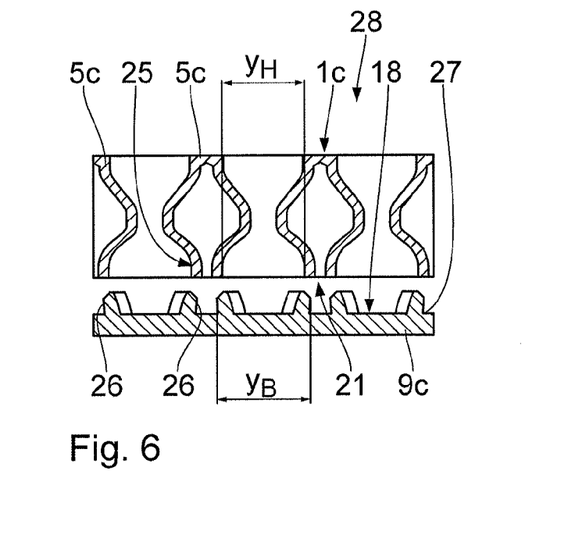
FIG. 6 shows a sectional representation along the sectional line VI-VI of FIG. 5 in a sectional plane extending parallel to a y-z plane.
Figure 7:
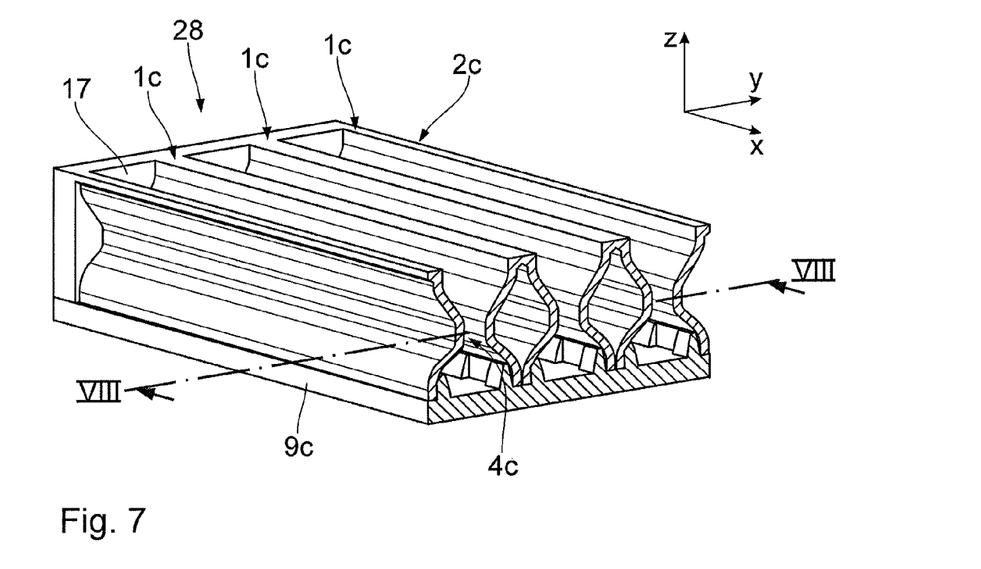
FIG. 7 shows a representation of the waveguide antenna corresponding to FIG. 5, with the waveguide and the base plate in a connected state.
Figure 8:
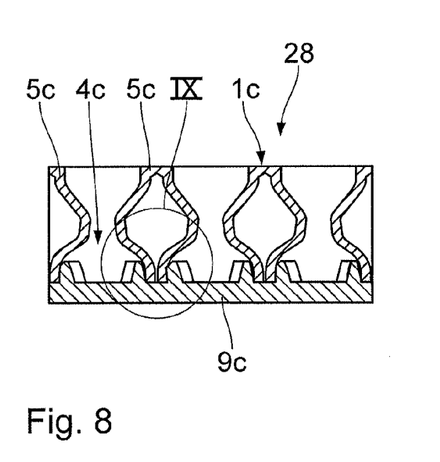
FIG. 8 shows a sectional representation along the sectional line VIII-VIII of FIG. 7 in a sectional plane extending parallel to a y-z plane.
Figure 9:
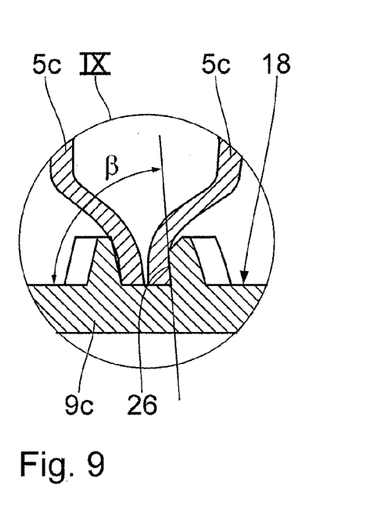
FIG. 9 shows an enlarged view of an attachment of the waveguide to the base plate according to detail IX of FIG. 8.

The base plate profile 19 comprises the structural elements in the form of ribs 10c arranged in the x direction and extending into the inner space 4c, which are formed as two-step ribs which are symmetrical with respect to their transverse axis 11c. The ribs 10c are arranged on the opposite sidewalls 5c in an offset manner along the x direction and, as described above, spaced apart from one another at periodic distances $d_p$ and/or aperiodic distances $d_{ap}$.

The waveguide profile 20 is arranged at lower ends of the sidewalls 5c, said lower ends facing the base plate 9c. The waveguide profile 20 comprises two fastening rows 21 arranged parallel to the x direction and spaced apart from one another, which have recesses 23 and fastening protrusions 24, respectively, corresponding to the ribs 10c and apertures 22 arranged between spaced-apart ribs 10c. In a connected state of waveguide 2c and base plate 9c, shown in FIGS. 7 to 9, the area of an inner surface 25 of the waveguide profile 20 facing the inner space 4c is flush against the area of an outer surface 26 of the base plate profile facing away from the inner space 4c. In this state the fastening protrusions 24 of the waveguide profile 20 engage the apertures 22 between adjacent ribs 10c. As the fastening protrusions 24 are shaped in a manner corresponding to the apertures 22, the waveguide 2c is connected to the base plate 9c in a form fit in the x direction. In the z direction the apertures 22 are open toward the top, such that the waveguide 2c including the protrusions 24 can be inserted into the apertures 22 from above opposite to the z direction.

According to the exemplary embodiment shown in FIGS. 5 to 9, the waveguide antenna 1c is made of plastics. Beam guidance in the waveguide antenna 1c is achieved by metallization of the plastic material. Due to the waveguide antenna 1c being made of plastics, the sidewalls 5c have an elasticity required for the process of mounting the waveguide 2c to the base plate 9c.

The elasticity of the sidewalls 5c is required because a distance $y_H$ of the fastening rows 21 on the sidewalls 5c arranged opposite one another is smaller than an extension $y_B$ of the base plate profile 19 in the y direction. This means that by plugging the waveguide 2c onto the base plate 9c from above opposite to the z direction, the sidewalls 5c are elastically bent away from one another by the ribs 10c of the base plate profile 19, and the inner space 4c is thus widened. As a consequence of the elastic reaction forces in the sidewalls 5c, which are directed towards the respective opposite sidewall 5c, the waveguide 2c is retained to the base plate 9c in a force fit, primarily in the z direction. In the exemplary embodiment shown, the outer surfaces 26 are at least partially inclined with respect to the top surface 18 of the base plate 9c and include an acute angle β. This creates an undercut 27 between the outer surface 26 of the ribs 10c into which the sidewall 5c can snap with its lower end. This enables the waveguide 2c to be clipped onto the base plate 9c and thus to be detachably connected to the base plate 9c.

Since the waveguide antenna 1c, i.e. both the waveguide 2c and the base plate 9c, are made of plastics, it is possible to manufacture the waveguide 2c and the base plate 9c by injection molding. It is also possible to manufacture one of the two components, i.e. waveguide 2c and base plate 9c, in particular the base plate 9c, applying the metal die-casting procedures such as, for example, zinc die-casting. What is important is that at least one of the two components can be elastically deformed such that it is possible to connect the components by clipping them on. Due to the design of the waveguide 2c with the rear wall 17 and the sidewalls 5c formed thereon and the base plate 9c with the base plate profile 19, these parts can be removed from the mold by means of removal steps comprising several stages, for example first by vertical removal along the z direction, followed by axial removal along the x direction. This enables an easy- and, in particular, cost-efficient-to-manufacture waveguide antenna 1c, especially in large-scale production. Mounting the waveguide antenna 1c is also made simpler and cost-efficient by this.

It has been shown that wall currents occurring in the region of the ribs 10c are approximately the same as for a waveguide without any structural elements. In the apertures 22 the power is shielded such that the wall currents are comparatively low in this region. The disconnection point between the waveguide 2c to be connected and the base plate 9c is selected to be in these regions. At the ribs 10c, on the other hand, the current density is high, such that the force-fit connection between the waveguide 2c and the base plate 9c is present there.

An arrangement 28 with three waveguide antennas 1c is represented according to the representations in FIGS. 5 to 9, wherein the base plate 9c and the waveguide 2c are formed such that a plurality of waveguide antennas 1c are arranged next to one another in the y direction.

Figure 10:
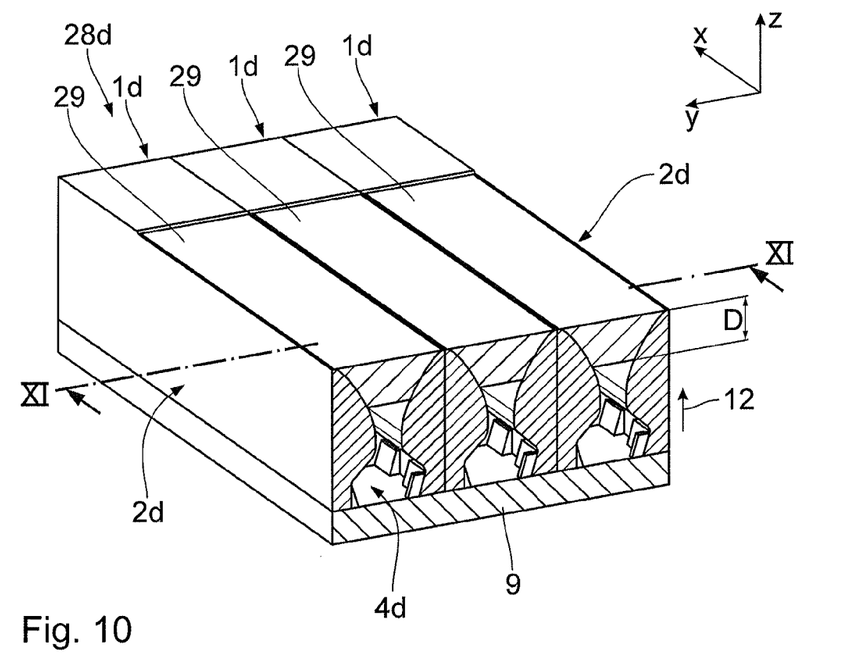
FIG. 10 shows a schematic representation of a plurality of waveguide antennas according to another exemplary embodiment, with a waveguide, a base plate and a cover.
Figure 11:
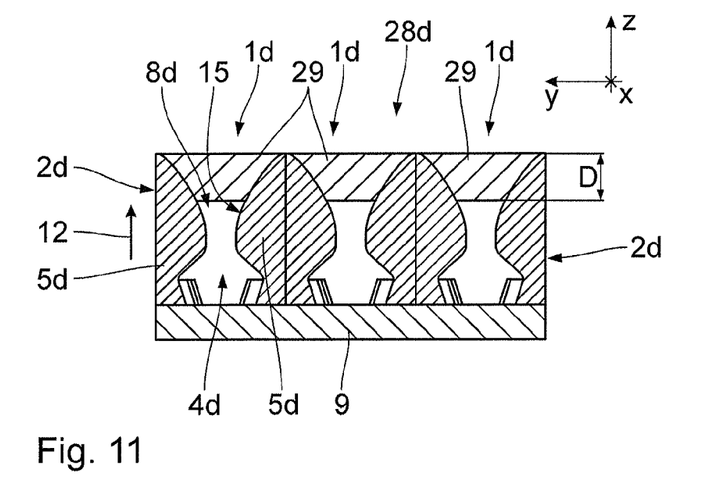
FIG. 11 shows a sectional representation along the sectional line XI-XI of FIG. 10 in a sectional plane extending parallel to a y-z plane.

In the following another exemplary embodiment of the invention will be described with reference to FIGS. 10 and 11. Structurally identical parts are given the same reference numerals as in the first exemplary embodiment, the description of which is hereby made reference to. Parts which are structurally different but have a similar function are given the same reference numerals, followed by a d. The exemplary embodiment represented in FIGS. 10 and 11 corresponds to an arrangement of a plurality of waveguide antennas 1d which are arranged next to one another in the y direction. For this purpose a plurality of waveguides 2d are arranged next to one another on the base plate 9 in the y direction. Furthermore, in each one of an opening 8d of the waveguide 2d a cover 29 is placed on the waveguide 2d. This ensures that the inner space 4d of the waveguide antenna 1d is not only sealed toward the bottom by the base plate 9, but also toward the top by the cover 29, thus being protected from environmental influences, in particular from dirt and moisture.

On the other hand, the cover 29 has to ensure that a radiation of the radar wave in the second mode is possible in the transverse direction 12. To enable a transparency of the cover 29 with respect to the radar wave in the second, the TE01, mode, the thickness D of the cover 29 in the transverse direction 12 is a function of a wavelength of the radar wave in the medium $\lambda_m$ of the cover 29, which can be determined from the free-space wavelength $\lambda_0$ and the dielectric constant of the medium. In particular, the thickness D is an integral multiple of half the wavelength in the medium $\lambda_m$, i.e.:

$$D = n \sim (\lambda_m/2).$$

The cover 29 is made of polytetrafluoroethylene, also known by its trade name Teflon, and comprises SiC as an attenuating material. To attenuate as little as possible the second mode of the radar wave radiated in the transverse direction 12, it is preferably sought to provide the cover 29 with a thickness D which is as small as possible, for example by selecting n=0 or n=1. As the thickness of the cover 29 has to be greater than 0, the thickness D is required to deviate from zero times half the wavelength in the medium $\lambda_m$. This deviation is less than 20% of the entire wavelength in the medium $\lambda_m$ and in particular less than 10% of the entire wavelength in the medium $\lambda_m$. The waveguide 2d has a cross-section in the shape of an hour-glass, wherein the sidewalls 5d each have a curvature 15 directed toward the inner space 4d. The cross-section of the waveguide 2d thus changes in the z direction. The surface of the cover 29 is flush against the output taper 16, which widens toward the opening 8d, i.e. the surface of the cover 29 is at least partially flush against the curvatures 15 of the sidewalls 5d. Cross-coupling of the radar wave guided in the waveguide 2d in the first mode into an adjacent waveguide 2d is not affected by this.

Figure 12:
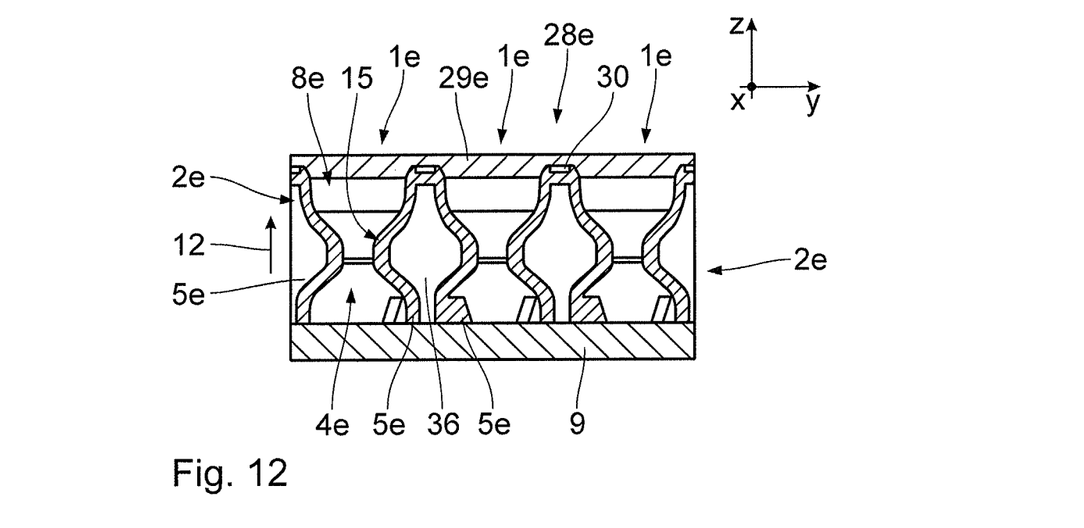
FIG. 12 shows a sectional representation of another exemplary embodiment corresponding to FIG. 11, with a cover placed onto a plurality of waveguide antennas.
Figure 13:
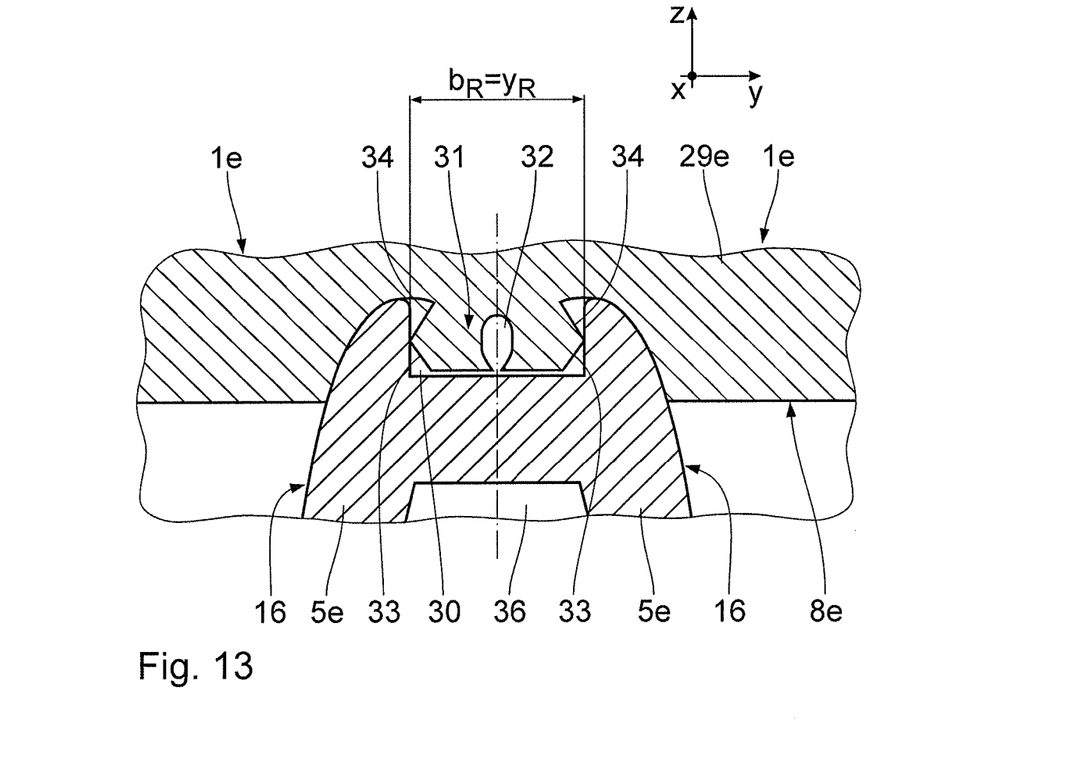
FIG. 13 shows an enlarged detailed view according to FIG. 12 as a representation of the connection of the cover to the waveguide antennas.

In the following, another exemplary embodiment of the invention will be described with reference to FIGS. 12 and 13. Structurally identical parts are given the same reference numerals as in the first exemplary embodiment, the description of which is hereby made reference to. Parts which are structurally different but have a similar function are given the same reference numerals, followed by an e. According to this exemplary embodiment, the arrangement 28e has a common, integrally formed cover 29e, which extends into the upper openings 8e of the waveguide antennas 1e at least partially. According to the arrangement 28d, the waveguide antennas 1e are arranged next to one another in the y direction and parallel to the x direction according to the exemplary embodiment in FIGS. 10 and 11.

The sidewalls 5e of adjacent waveguide antennas 1e are formed integrally with one another and include a sidewall cavity 36. It is also possible to connect the sidewalls 5e integrally such that a common, solid piece is formed rather than a cavity. At an upper end facing the cover 29e, the sidewalls 5e have a groove 30 which extends along the x direction. The groove 30 has a cross-section which is rectangular perpendicularly to the x direction, and it serves to receive at least one locking projection 31 of the cover 29e for a locking connection of the cover 29e to the waveguide antennas 1e of the arrangement 28e. The cover 29e can thus be placed onto the arrangement 28e particularly fast and easily by clipping it on, such that the waveguide antennas 1e can be manufactured particularly fast, easily and cost-efficiently.

The locking projection 31 also extends in the x direction and can, in particular, have a length in the x direction which is identical to the length of the groove 30. It is also possible that a plurality of locking projections 31 are arranged along the x direction one after the other.

The locking projection 31 has a centrally arranged deformation slot 32 which is open at the bottom toward the sidewalls 5e. The locking projection 31 further has a width $y_R$ in the y direction which, in the unmounted state of the cover 29e on the arrangement 28e, is larger than a width $b_R$ of the groove 30 in the y direction. Since the cover 29e is made of polytetrafluoroethylene, i.e. of plastics, it can be elastically deformed such that the cover 29e can be locked in the grooves 30 with the locking projections 31. The width $y_R$ of the locking projection is reduced during this process as the locking projection 31 is compressed in the y direction. Said compression is made possible by the deformation slot 32. In the mounted state of the cover 29e on the arrangement 28e according to the representation in FIG. 13, the widths $b_R$ of the groove 30 and $y_R$ of the locking projection 31 are identical. The groove 30 and the locking projection 31 are designed such that the cover 29e is retained in the arrangement 28e in a secure, force-fit and at the same time detachable manner. The locking projection 31 further has insertion inclinations 33 and pull-out inclinations 34 for a simplified mounting and demounting of the arrangement 28e.

The groove 30 further serves to prevent a radar wave guided in a waveguide 1e from cross-coupling into an adjacent waveguide antenna 1e.

Figure 14:
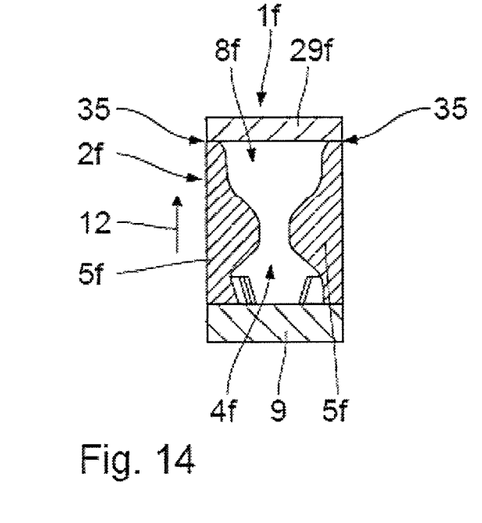
FIG. 14 shows a sectional representation of another exemplary embodiment of a waveguide antenna corresponding to FIG. 11.

In the following, another exemplary embodiment of the invention will be described with reference to FIG. 14. Structurally identical parts are given the same reference numerals as in the first exemplary embodiment, the description of which is hereby made reference to. Parts which are structurally different but have a similar function are given the same reference numerals, followed by an f. The waveguide antenna 1f also has a cover 29f, which does not protrude into the inner space 4f of the waveguide 2f, however. The cover 29f is thus formed in a planar manner with a rectangular cross-section, similar to the base plate 9. The base plate 9 and the cover 29f are each attached in the z direction to a lower and upper end, respectively, of the waveguide 2f. The base plate 9 and the cover 29f can be fastened to the waveguide 2f, for example, by gluing or electroplating.

It is possible for the cover 29f to act like a waveguide in the waveguide antenna 1f for part of the power to be radiated from the TE01 mode. This means that power from the TE01 mode to be radiated is coupled, via the cover 29f, into the TE01 mode of a waveguide antenna arranged adjacently in the y direction and is converted at the rib structures to the TE10 mode guided in the adjacent waveguide. This so-called cross-coupling of power to be radiated from a waveguide antenna into a waveguide antenna arranged adjacent thereto is reduced by using a cover made of material having attenuating properties. Due to the small thickness D of the cover 29, 29e (cf. FIGS. 10 to 13), the power radiated from the TE01 mode into the z direction is attenuated only slightly. However, the power cross-coupled into the adjacent waveguide is attenuated to a very much larger extent due to the greater path length in the attenuating cover 29, 29e. Cross-coupling is further reduced by the groove 30 according to the waveguide antenna 1e represented in FIGS. 12 and 13.

Figure 15:
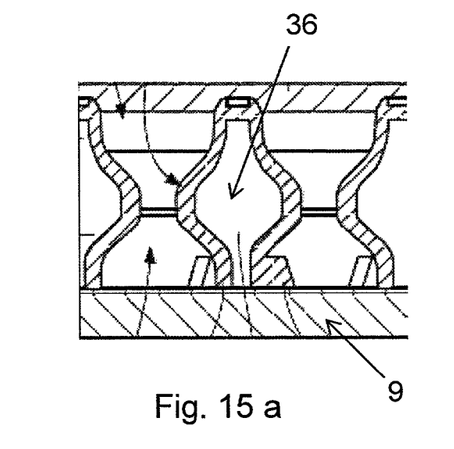
FIGS. 15a-15b show yet another sectional representation of an exemplary embodiment of a waveguide antenna.

In a further exemplary embodiment a compact structure of a radar system is provided based on the waveguide antenna according to the invention. In addition to the antenna, the radar system comprises a device for processing high-frequency signals, in particular for controlling the antenna or for generating the signal to be radiated. Furthermore, for controlling the radar system and, usually, for evaluating the data, a device for processing low-frequency signals is provided. In particular the components of a device for processing low-frequency signals usually take up much space. Some components, e.g. capacitors, are not readily available in a flat design. In FIG. 12 an example of an antenna arrangement is provided, having a space (36) between the antennas. To achieve a compact structure, components (37) are now arranged in the interstitial spaces (36), as shown in FIGS. 15a-15b. Alternatively or in addition, components (capacitors, printed circuit boards, etc.) are integrated into the base plate (9) so as to use the available space efficiently.

The invention claimed is:

1. A waveguide antenna for a radar antenna array comprising:
 a metal waveguide extending in an x direction and having a longitudinal axis, said waveguide delimiting an inner space,
 wherein a radar wave of a first mode propagates in the inner space in the x direction with a first waveguide wavelength,
 wherein said waveguide has a plurality of structural elements which are arranged in the x direction and extend into the inner space,
 wherein adjacent structural elements have a distance in the x direction which is larger than half of the first waveguide wavelength of the radar wave of the first mode such that the first mode is converted to a second mode of the radar wave which propagates with a second waveguide wavelength in a direction transverse to the x direction such that the second mode is different from the first mode and is coupled out of the waveguide.

2. A waveguide antenna according to claim 1, wherein the structural elements each extend along a transverse axis which includes an acute angle with the longitudinal axis.

3. A waveguide antenna according to claim 2, wherein the structural elements have a constant structural height along the transverse axis.

4. A waveguide antenna according to claim 1, wherein the waveguide has a cross-section oriented in a z direction which is perpendicular to the x direction, said cross-section having two sidewalls which are arranged opposite one another and which are provided on their inner surfaces with ribs as structural elements.

5. A waveguide antenna according to claim 4, further comprising a two-step rib which is symmetrical with respect to the transverse axis.

6. A waveguide antenna according to claim 4, wherein the ribs of opposite sidewalls are arranged in an offset manner along the x direction.

7. A waveguide antenna according to claim 1, further comprising a dielectric or diaphragms arranged at periodic distances provided in the waveguide for reducing the waveguide path length.

8. A waveguide antenna according to claim 1, wherein the waveguide is connected to a base plate.

9. A waveguide antenna according to claim 8, wherein grooves or ribs are arranged on the base plate as structural elements.

10. A waveguide antenna according to claim 1, wherein a cross-section of the waveguide changes in the vertical z direction.

11. A waveguide antenna according to claim 10, wherein the cross-section of the waveguide is designed in an hourglass shape, wherein the sidewalls each have a curvature directed toward the inner space.

12. A waveguide antenna according to claim 1, wherein at least some adjacent structural elements are arranged in the x direction at a periodic distance from one another.

13. A waveguide antenna according to claim 12, wherein at least some adjacent structural elements are arranged in the x direction at an aperiodic distance from one another, where the aperiodic distance of adjacent structural elements in the x direction deviates by less than 5% from the periodic distance.

14. A radar sensor, comprising:
 at least two waveguide antennas according to claim 1, wherein said antennas are arranged on a base plate such that a space is formed between the sidewalls of the antennas.

15. A radar sensor according to claim 14, wherein at least one of a capacitor and a printed circuit board is attached to the base plate.

16. A radar sensor according to claim 14, wherein at least one capacitor is arranged in the space between the sidewalls of the antennas.

* * * * *